Sept. 11, 1923.

H. R. RAPER 1,467,876

FILM PACKET FOR X-RAY WORK

Filed June 17, 1922    3 Sheets-Sheet 1

INVENTOR.
Howard Riley Raper
BY
his ATTORNEY.

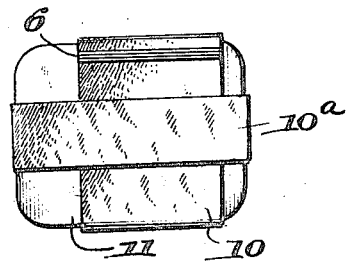
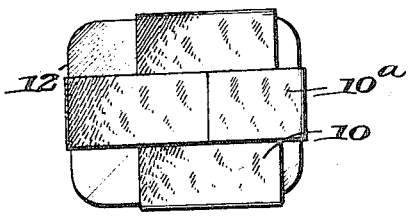
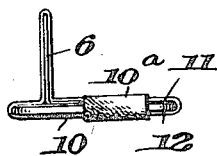
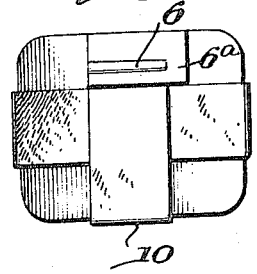
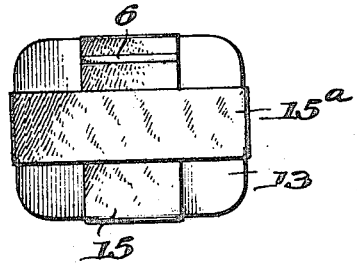
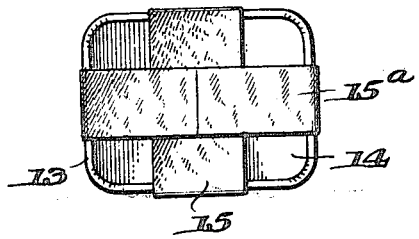

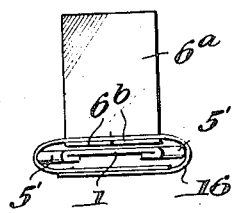
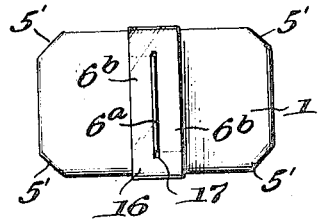
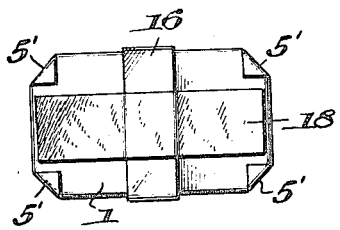
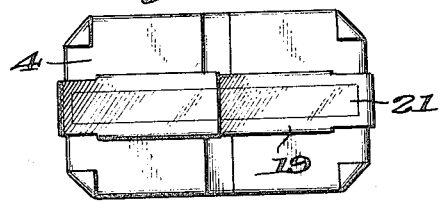
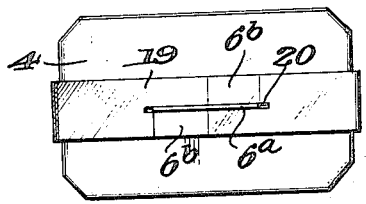
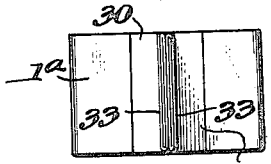
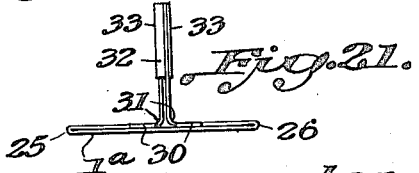
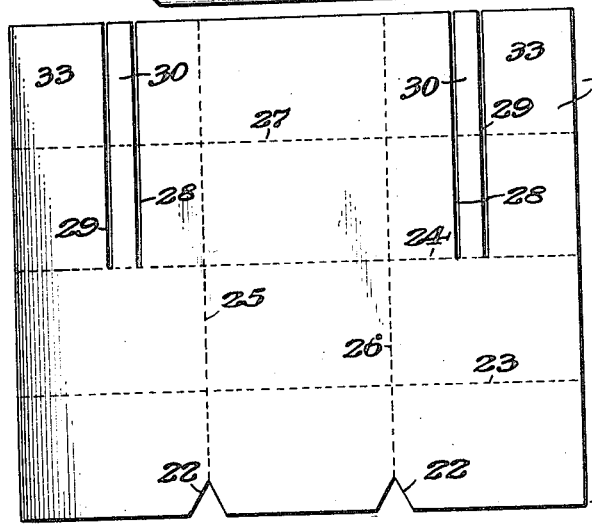

Patented Sept. 11, 1923.

1,467,876

UNITED STATES PATENT OFFICE.

HOWARD RILEY RAPER, OF ALBUQUERQUE, NEW MEXICO.

FILM PACKET FOR X-RAY WORK.

Application filed June 17, 1922. Serial No. 569,186.

*To all whom it may concern:*

Be it known that I, HOWARD RILEY RAPER, a citizen of the United States, residing at Albuquerque, in the county of Bernalillo and State of New Mexico, have invented certain new and useful Improvements in Film Packets for X-Ray Work, of which the following is a specification.

This invention relates to film packets for intra-oral X-ray work and has for its principal object the provision of a tab or wing, which I shall designate a "bite-wing," which enables the patient to hold the film packet inside the mouth in position with the teeth closed against the wing or tab so that the operator may simultaneously radiograph the crowns and edge of the alveolar process of the upper and lower teeth on the same film.

It is a common experience for a dentist to be unable to locate carious cavities and pyorrhea pockets unless resort is had to thorough X-ray examination which requires ten or more films to cover the upper and lower teeth.

My present bite-wing or tab carried by the film packet so as to be unitary therewith when manufactured, or applied later to the packet by the operator, enables complete radiographs of the crowns and edge of the alveolar process of the upper and lower teeth to be obtained by the use of only five film packets due to the fact that the upper teeth being closed down upon the lower teeth and the bite-wings or tab being properly arranged, radiographs of upper and lower teeth, covering a given area, are taken simultaneously. Heretofore ten or more film packets have been required for radiographing all upper and lower teeth. By using my improved packet not only is the expense to the patient correspondingly decreased but much time is saved, and most important of all, the film packet is held in the proper position by the "bite" of the patient to insure radiographs having good radiographic images of both the upper and lower crowns and alveolar crests, assuming that the operator has the X-ray tube disposed at the proper angle for the given teeth being radiographed.

My invention may be carried out in connection with any of the well known film packets for dental X-ray work by the application thereto of a tab or bite-wing by the user or operator, or the invention may be carried out by embodying it in a film packet at the time of manufacture of the latter.

The invention in its broadest aspect comprises a tab or wing of radio-parent or radio-lucent material, however, and whenever, applied to the film packet. Preferably, the tab or bite-wing is adapted to fold down into general flatwise relation to the film packet so that the packets may be compactly packed, but the invention is not limited to the feature of foldability.

When the invention is applied to that type of film packet having sharp corners, I prefer to provide the further improvement of crushing or bending or rounding down the corners of such packet, thereby rendering the packet comfortable to the patient.

In my film packet the outer wrapper may be either light-proof paper or moisture-proof paper, or only a single light-proof wrapper may be used in lieu of inner and outer wrappers, in which event the single wrapper may be moisture-proof on one side. When the black paper is outermost, it is easier to bend down the corners of the packet, the bite-wing is more securely attached than to the oiled red paper, and the black paper is softer and more agreeable to the tissues of the mouth than is the red, oiled paper.

When applying the invention to modern film packets, the bite-wing or tab may be applied by a strip of adhesive gauze, or special-shaped wrapper.

When applied to those film packets having an oil paper envelope or wrapper, the bite-wing is connected to the packet in an improved manner whereby the envelope is sealed; or, the bite-wing may be incorporated as a part of either the black paper wrapper or the moisture-proof wrapper, if desired.

A stiffener may be used in connection with the device employed to attach the bite-wing to the packet.

The attaching and sealing band and bite-wing may be of celluloid and said band may be removable, if desired, to enable it to be applied to other film packets than the one to which it is originally attached.

Regardless of the particular manner of attaching the bite-wing to the packet, I prefer to so connect the bite-wing to the packet that it may be disconnected if it is desired to use the film packet in the ordinary manner.

The plane of the bite-wing may extend in the direction of the greater length of the film packet, or in the direction of the shorter length, according to the character of the teeth which are to be X-rayed. If desired, a piece of metal of the size of the film may be enclosed in the packet for the purpose of improving the photographic quality of the radiograph.

My film packet having a bite-wing enables the operator to make radiographs intro-orally of the crowns and crests of the alveolar process of the upper and lower teeth simultaneously on the same film.

Ordinarily, when simultaneously radiographing upper and lower crowns and alveolar crests, the root ends of the teeth do not show up. To obtain a radiograph of the root ends of upper or lower teeth, in addition to their crowns, the bite-wing may be detached.

It may become desirable to use hemostatic forceps to pull the film packet into position, if the operator cannot pull the packet into position by using his fingers.

The film packet having a bite tab or wing according to the present invention renders it possible to make an X-ray examination of the mouth, searching for dental caries and incipient pyorrhea in half the number of exposures which would be necessary by methods at present known and practiced, and it brings the cost of such an examination down to a point where many people can afford such an examination whereas they could not afford it under present conditions of X-ray examination. My invention therefore brings within the reach of persons of moderate means an insurance against having to wait until decay in the proximate surface of teeth reaches the pulp before a dentist using ordinary exploring instruments can determine where such decayed spot exists.

In the accompanying drawings:

Figs. 7 and 8 are opposite plan views of another film packet to which the bite-wing has been applied.

Fig. 9 is an end elevation thereof.

Fig. 9$^a$ is a view showing how a block can be applied to the bite-wing.

Figs. 10 and 11 are opposite plan views of another film packet to which the bite-wing has been applied.

Fig. 12 is an end elevation thereof.

Fig. 13 is an end view of a modification showing the use of a celluloid bite-wing and attaching band.

Fig. 14 is a plan view thereof.

Fig. 15 is a bottom view showing how an attaching band of the form shown in Figs. 13 and 14 may be retained by a strip of adhesive gauze.

Fig. 16 is a side elevation of another modification having a removable celluloid attaching strip or band and bite-wing.

Fig. 17 is a plan view thereof.

Fig. 18 is a bottom view thereof.

Fig. 19 is a view of a paper or envelope blank illustrating a form in which the bite-wing is integral with the envelope or wrapper; and Figs. 20 and 21 are plan and side views, respectively, of a film packet whose envelope is made from the blank shown in Fig. 19.

Figure 1:
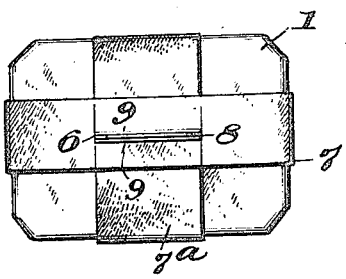
Figures 1 and 2 are opposite plan views of the film packet.
Figure 2:
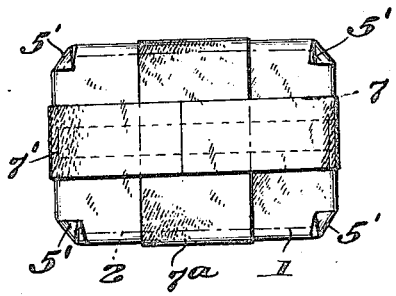
Figure 3:
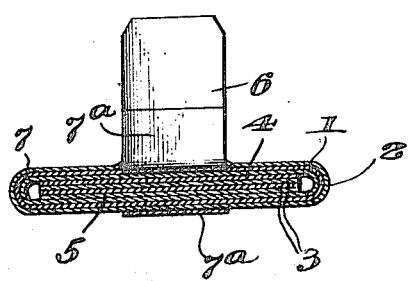
Fig. 3 is a diagrammatic longitudinal section through the film packet showing the bite-wing, the sectioned parts being greatly exaggerated in size.
Figure 4:
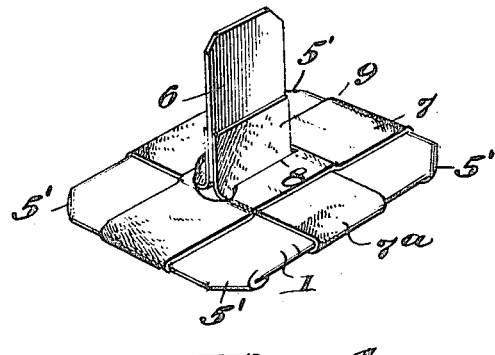
Fig. 4 is a perspective view, parts being broken away to illustrate the connection of the adhesive gauze to the bite-wing.
Figure 5:
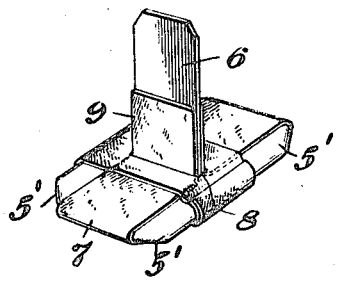
Figs. 5 and 6 are oppositely arranged perspectives of a modified form of film packet.
Figure 6:
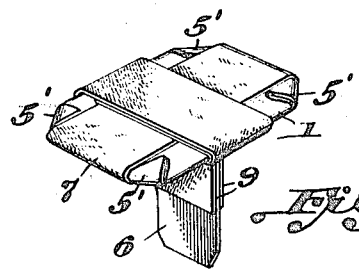

Reference will first be made to Figs. 1 to 6, showing one embodiment of my invention.

A well-known film packet has an outer moisture-excluding oil-paper red envelope or wrapper, and an inner blank paper envelope or wrapper enclosing the film.

I may reverse the arrangement of the moisture-excluding paper and black paper, thereby obtaining advantages hereinbefore set forth.

In my film packet the outermost envelope or wrapper 1 may be moisture-proof paper and the inner envelope 2 light-proof paper, or, this arrangement may be reversed, the outer wrapper 1 being light-proof paper and the inner envelope 2 moisture-excluding paper, or the light-proof paper or material may be moisture-proof on one side and not moisture-proof on the other side.

The pieces of film 3 lie between a piece of black paper 4 of the same size and shape, and a piece or disc of metal 5. The wrappers 1 and 2 enclose the film 4, piece of black paper 4, and metal plate 5.

The packet is preferably rectangular in shape, as this is the shape in which film packets are usually sold to the trade.

I have also improved this type of packet, by crushing down or bending the corners to round them, as shown at 5', to correspond with the rounded corners of the enclosed films 3, backing 4, and plate 5, thereby obviating what has heretofore been a serious practical objection to the use of earlier film packets.

The sharp corners of this film packet irritated the mouth of the patient and while not injuring the mouth, the tickling sensation has resulted in gagging and declarations by patients that the film hurt them.

My invention in respect to the bite-wing, resides, broadly, in the provision of a bite-wing or tab 6 attached to, or adapted to be attached to, the film packet and made of radio-parent or radio-lucent material, so that no interference will be had with the making of the radiograph. Preferably, the bite-wing or tab 6 is attached to, or adapted to be attached to, the film packet in such manner that it may be folded down flat to enable the packets to be compactly packed. To that end, I use a bendable connection such as adhesive gauze 7ª. To hold the bite-wing and seal the film packet this gauze may be passed around the packet and, preferably, around it both lengthwise and crosswise thereof. Two strips of the adhesive gauze 7, 7ª may be used, one of the strips having a slot 8 through which the ends of the other strip are brought and then pasted to the opposite sides of the bite-wing, as shown at 9.

The bite-wing may have its plane disposed in the direction of the greater, or of the lesser, dimension of the film packet, as shown in the various forms illustrated in the drawing.

Adhesive gauze seals the film packet and prevents it from opening up accidentally and also serves as a connection for the bite-wing. It is to be understood, however, that attaching and sealing means other than adhesive gauze, may be employed, as any material which will not cast an obscuring shadow on the radiograph and will have suitable securing properties, may be used.

The gauze strips 7, may be as wide as shown in the drawings, or narrower. If the gauze strip 7 is too wide it will have a tendency to prevent the film from bending correctly when being pulled into proper position in the mouth of the patient. This difficulty is not encountered in narrow gauze strips running lengthwise of the packet. If a wide gauze strip is employed, it may be found advisable (to insure proper bending when the packet is used) to back up the strip 7 by a metal or other backing strip, shown in dotted lines at 7', Fig. 2, lying between the strip 7 and the packet.

In Figs. 7, 8, 9, I have shown how the principle of the bite-wing may be applied to an ordinary film packet. The bite-wing 6 is connected to the packet by a piece of adhesive gauze 10 passing around the packet and pasted to the black paper 11 and metal back 12 thereof. The intermediate portion of the gauze is pasted to the bite-wing 6. Another piece of adhesive gauze 10ª crosses the piece 10 and is pasted to it and to the paper 11 and back 12.

As shown in Fig. 9ª a slotted block 6ª may be slipped over the bite wing, if desired.

In Figs. 10, 11, 12, I have illustrated how the bite-wing 6 may be connected to the film packet having the outer black paper 13 and the back colored paper 14 by a piece of adhesive gauze 15 which is crossed by another strip 15ª of adhesive gauze passing longitudinally around the packet.

It will be observed that the bite wings shown in Figs. 7 to 12, are disposed well toward one of the lower edges of the film packet. This disposition enables not only the crowns and alveolar process but the root ends also to be radiographed.

In the forms of the invention shown in Figs. 1 to 12, and in any forms using adhesive gauze in crossed arrangement, the transversely and longitudinally arranged strips of gauze may be in separate pieces, as shown and described, or, they may be made from a single blank, appropriately cut or formed to provide them, all such arrangements being within the spirit of the invention.

Referring to the modification shown in Figs. 13 and 14, there appears the outer black paper or envelope wrapper 1 with bent corners 5'. Instead of adhesive gauze, this form is provided with a band of celluloid 16 which can be readily slipped over the packet, even by the operator, as this form of the band permits the band to be used successively on different film packets. By springing the band 16 slightly, it may be slipped over the film packet. The bite-wing 6ª is of celluloid and is provided with bent ends 6ᵇ extending in opposite directions and passed through a slit 17 in the band 16 and secured thereto. In this form, the bite-wing extends transversely of the film packet as in the form shown in Figs. 5 and 6, and the construction is adapted for use in the front of the mouth.

Figure 15 illustrates how the band 16 may be held against sliding by applying a strip of adhesive gauze 18 to the film packet on the opposite side from the bite-wing.

Referring to Figs. 16, 17, 18, there is illustrated a form of the invention wherein the bite-wing has its plane extending in the direction of the greater length of the film packet 4. The celluloid band 19 extends around the greater length of the film packet and is provided with a slit 20 through which the bent ends 6ᵇ of the celluloid bite-wing 6ª pass, said bent ends being secured to the celluloid band 19. A stiffening metal strip 21 may be used, if desired, just as the stiffener 7' is used in the packet shown in Fig. 2.

In this form of the invention the celluloid band 19 can be used, with the bite-wing, over and over again on different film packets.

Referring to Figs. 19, 20 and 21, I have shown one form the invention may assume when the bite-wing is formed from the same blank as the paper of the film packet, for instance when it is a part of the black lightproof paper wrapper 1ª. The blank 1ª may have notches 22 at one edge, two longitudinal folding lines 23, 24, and cross folding lines 25, 26. The film and corresponding piece of black paper and the metal plate lie in the area 23, 24, 25, 26, when the packet is folded and in its form shown in Figs. 20 and 21.

The blank also has a longitudinal folding line 27 and cuts 28, which enable the paper to be folded to completely enclose the film, metal plate and piece of black paper. Additional slits 29, running parallel to the slits 28, define tongues 30 which fold around the packet as seen in Figs. 20, 21, and reinforce the bends 31 at the bases of the bite-wings 32. The bite-wings 32 are formed from the ends of the blank, including the broad tongues 33 defined by the slits 29. The bite-wings are pasted together by some suitable means so that they constitute a single bite-wing.

When the packet and bite-wing are made from a single blank, an example of which is shown in Figs. 19, 20, 21, it is advisable to reinforce the blank by cloth pasted thereto which will constitute a backing preventing tearing of the paper on account of the latter becoming moistened.

Figures 19, 20 and 21 illustrate but one of many embodiments of the invention in a blank where the bite-wing is integral with the wrapper.

I am aware that my improved bite-wing may comprise merely a wing, not originally attached to the film pocket, but adapted for attachment thereto, in any manner, by the operator or other person buying a packet having no bite-wing. A fine wire may be used to attach the bite-wing to the film packet. The bite-wing can be pasted direct onto the sensitive surface of the film packet either at the time of manufacture or afterward.

So far as I am aware I am the first to provide a film packet having a bite-wing, attached at the time of manufacture or afterward and regardless of specific construction or manner of attachment, and whether permanently attached or severable or removable from the packet which enables the film packet to be used for simultaneously radiographing the coronal portions of both upper and lower teeth.

So far as I am aware, I am the first to employ the method of pulling or drawing a film packet into position by the use of a bite-wing, however constructed and attached, in such manner as to bring the film packet into such position that the coronal portions of both upper and lower teeth may be radiographed simultaneously.

It is to be understood that the illustration and description of various modifications herein is by way of example and not in limitation of the scope of the invention, as my invention is not limited to any specific bite-wing nor to its manner of attachment to the film packet, nor to whether it is attached at the time of manufacture or afterward, nor whether it is adapted for use successively with a number of different film packets, nor to its position or relation to the edges or extent of the film packet.

The film packet should be flexible so it will bend, yield, or conform itself to the mouth of the patient. By using the word "flexible" in the claims, I intend to cover any embodiment falling within the foregoing description and which will permit the operator to draw the film packet tight against the tissues inside of the mouth.

I do not limit myself to a bite-wing made of a material which is resilient or will spring back into its former position.

In using the words "detachable" and "severable," in the claims, I intend to cover separation from the film packet whether such separation is effectd by bodily detachment, or by cutting, or tearing, or mere removal, or however accomplished.

I claim:

1. A dental film packet provided with a bite-wing, means for securing said bite-wing to the film packet so that when the film packet is back of the teeth tension on the bite-wing will cause the film packet to bend somewhat in the general central region thereof and on a line parallel with the plane of the bite-wing.

2. A dental film packet having a relatively thin, pliable bite-wing for holding the packet in operative position.

3. A dental film packet having a relatively X-ray translucent bite-wing for holding the packet in operative position.

4. A dental film packet having a bite-wing flexibly connected thereto and adapted to be held in operative position by the teeth of a patient.

5. An attachable and detachable film packet holder provided with a pliable bite-wing which may be engaged by the teeth of a patient to hold the packet in operative position.

6. An attachable and detachable film packet loop-holder provided with a bite-wing flexibly connected thereto which may be engaged by the teeth of a patient to hold the packet in operative position.

7. A dental film packet provided with a bite-wing so located that, when said bite-wing is held by the upper and lower teeth of the patient, the film packet will be located in the patient's mouth in position to permit simultaneous radiographing of both the upper and lower teeth on the film of said packet.

8. A dental film packet provided with a bite-wing, means by which said bite-wing may be disposed in the general central region thereof so that, when said bite-wing is held by the upper and lower teeth of the patient, the film packet will be located in the patient's mouth in position to permit simultaneous radiographing of both the upper and lower teeth on the film in said packet.

9. A dental film packet provided with a flat, relatively thin, pliable bite-wing whose plane lies substantially in a median line of the packet so that, when said bite-wing is held by the upper and lower teeth of the patient, the film packet will be located in the patient's mouth in position to permit simultaneous radiographing of both the upper and lower teeth on the film in said packet.

In testimony whereof I affix my signature.

HOWARD RILEY RAPER.